US008889281B2

(12) United States Patent (10) Patent No.: US 8,889,281 B2
La Mantia et al. (45) Date of Patent: Nov. 18, 2014

(54) BATTERIES FOR EFFICIENT ENERGY EXTRACTION FROM A SALINITY DIFFERENCE

(75) Inventors: Fabio La Mantia, Bochum (DE); Mauro Pasta, Ubiale Clanezzo (IT); Heather Dawn Deshazer, Palo Alto, CA (US); Yi Cui, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 98 days.

(21) Appl. No.: 13/287,018

(22) Filed: Nov. 1, 2011

(65) Prior Publication Data

US 2012/0135282 A1 May 31, 2012

Related U.S. Application Data

(60) Provisional application No. 61/409,428, filed on Nov. 2, 2010.

(51) Int. Cl.
*H01M 8/18* (2006.01)
*H01M 14/00* (2006.01)
*H01M 6/34* (2006.01)

(52) U.S. Cl.
CPC .............. *H01M 14/00* (2013.01); *H01M 6/34* (2013.01); *Y02E 60/12* (2013.01)
USPC .......................................... 429/101; 429/119

(58) Field of Classification Search
USPC ................................................ 429/101, 119
See application file for complete search history.

(56) References Cited

U.S. PATENT DOCUMENTS

| | | | |
|---|---|---|---|
| 3,915,745 A | 10/1975 | Ikeda et al. | |
| 3,941,616 A | 3/1976 | Huhta-Kowisto | |
| 4,171,409 A | 10/1979 | Loeb | |
| 4,292,378 A | 9/1981 | Krumpelt et al. | |
| 5,068,014 A * | 11/1991 | Brusson et al. | 205/447 |
| 6,013,192 A * | 1/2000 | Tucker et al. | 252/62.2 |
| 7,736,791 B1 | 6/2010 | Merz | |

FOREIGN PATENT DOCUMENTS

| | | | | |
|---|---|---|---|---|
| JP | 11-317247 | 11/1999 | | |
| JP | 2004-335312 | 11/2004 | | |
| WO | WO-2010104387 | * | 9/2010 | H01G 7/00 |

OTHER PUBLICATIONS

Search Report for PCT/US2011/058839 dated May 17, 2012.

* cited by examiner

*Primary Examiner* — Ula C Ruddock
*Assistant Examiner* — Frank Chernow
(74) *Attorney, Agent, or Firm* — Foley & Lardner; Cliff Z. Liu (57) ABSTRACT

An electrochemical system includes: (1) a battery including an anode and a cathode; (2) a first source of a first electrolyte having a first concentration of ions; (3) a second source of a second electrolyte having a second concentration of the ions, wherein the second concentration is greater than the first concentration; and (4) a fluid conveyance mechanism connected between the battery and each of the first source and the second source. During charging of the battery, the anode and the cathode are at least partially immersed in the first electrolyte, and, during discharging of the battery, the anode and the cathode are at least partially immersed in the second electrolyte. The fluid conveyance mechanism exchanges the first electrolyte with the second electrolyte between charging and discharging of the battery, and exchanges the second electrolyte with the first electrolyte between discharging and charging of the battery.

19 Claims, 10 Drawing Sheets

BATTERIES FOR EFFICIENT ENERGY EXTRACTION FROM A SALINITY DIFFERENCE

CROSS REFERENCE TO RELATED APPLICATION

This application claims the benefit of U.S. Provisional Application No. 61/409,428, filed on Nov. 2, 2010, the disclosure of which is incorporated herein by reference in its entirety.

BACKGROUND

The major components of the global water cycle involve distillation of water from oceans by evaporation, precipitation, and collection of the resulting fresh water in rivers, lakes and aquifers, with mixing of fresh water and salt water in estuaries. Solar energy drives this cycle, creating a significant salinity difference between seawater and fresh water. The entropic energy created by the difference in water salinities is normally dissipated when river water flows into the sea. This reduction in free energy due to the mixing is estimated at about 2.2 kJ of free energy per liter of fresh water that flows into the sea (based on the osmotic pressure difference between fresh water and sea water). To date this significant and renewable energy source has not been harnessed, although several types of technologies have been proposed in order to take advantage of this renewable energy source.

Past suggestions for capturing energy from the mixing of seawater and fresh water include: pressure-retarded osmosis, based on semipermeable membranes; reverse electrodialysis, based on ion selective membranes; concentration electrochemical cells; and devices exploiting differences in vapor pressures. Low energy efficiencies, high costs, and short lifetimes (e.g., fouling) of membranes have prevented a large-scale utilization of membrane-based techniques for energy extraction. Implementation of the vapor pressure method has been difficult due to its reliance on a relatively small pressure difference, resulting in unstable power output. Concentration electrochemical cells produce energy from the concentration difference of chloride ions in two separate half cells, and thus they generally fail to capture at least half of the available energy (since free energy is stored nearly equally by both anions and cations). Moreover, the use of membranes to separate water into two compartments produces high internal resistances, and high energy losses, resulting in a theoretical energy conversion efficiency of less than about 42%.

More recently, a method for extracting energy from both cations and anions from the mixing entropy of seawater and river water was proposed using an electrochemical double layer capacitor technology, with activated carbon electrodes. Despite the promise of this technology, the use of supercapacitor electrodes has several technical challenges, resulting in an energy conversion efficiency of less than about 24%. These challenges include high sensitivity to impurities and dissolved oxygen, causing self-discharge, and the use of electrode material interface for energy storage, limiting the amount of charge that can be stored to the surfaces of the electrodes. In addition, a pre-charge voltage had to be applied to the electrodes to adsorb anions and cations at the surfaces of the electrodes.

It is against this background that a need arose to develop the batteries and related systems and methods described herein.

SUMMARY

The salinity difference between seawater and river water generates a source of large scale entropic energy, but extracting it efficiently as a form of useful energy thus far has remained a challenge. Certain aspects and embodiments of the invention relate to a device called a "mixing entropy battery," which can extract the otherwise wasted entropic energy and store it as chemical energy, allowing renewable production of electricity. This mixing entropy battery can be applied to extract energy from the salinity difference between seawater and river water. The working principle of this mixing entropy battery is demonstrated using a variety of salt waters. One embodiment of the battery showed an energy extraction efficiency of about 74%, with efficiencies of more than about 85% through device optimization, thus significantly surpassing previously proposed technologies. Assuming the flow rate of river water into the ocean as the limiting factor, calculations of potential energy production indicate that the total generated renewable energy could reach about 2 TW, or about 13% of the current world energy consumption.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

FIG. 2: (a) Schematic representation of the working principle behind a complete cycle of the mixing entropy battery, showing how energy extraction can be accomplished. Step 1: charge in river water; Step 2: exchange to sea water; Step 3: discharge in sea water; and Step 4: exchange to river water; (b) Typical form of a cycle of battery cell voltage ($\Delta E$) versus charge (q) in a mixing entropy battery, demonstrating the extractable energy.

FIG. 3: Gibbs free energy of mixing as a function of the volumetric fraction of sea water ($\chi$), calculated at 298 K, mixing a 0.6 M solution and a 0.024 M solution per unit volume of (a) final solution and (b) low concentration solution. (c) Estimated extractable power (GW) from the difference of salinity in different countries, based on flow of river water emptying into the ocean.

FIG. 4: (a) Measured open circuit potentials for the $AgCl/Na_2Mn_5O_{10}$ system at different concentrations of NaCl in aqueous solution. (b) Measured potential (E) of individual Ag/AgCl (bottom) and $Na_{2-x}Mn_5O_{10}$ (top) electrodes versus Ag/AgCl reference electrode during the cycle of energy extraction. (c) Energy extraction cycle for the $AgCl/Na_2Mn_5O_{10}$ system in a $\Delta E$ vs q. plot (the area is equal to the extracted energy). (d) Energy per area extracted vs. number of cycles for the $AgCl/Na_2Mn_5O_{10}$ system.

FIG. 5: (a) Measured open circuit potential for the $AgCl/LiFePO_4$ system at different concentrations in aqueous solution. (b) Measured potential of individual Ag/AgCl (bottom) and $FePO_4/LiFePO_4$ (top) electrodes versus Ag/AgCl reference electrode during the cycle of energy extraction. (c) Energy extraction cycle for the $AgCl/LiFePO_4$ system in a $\Delta E$ vs q. plot (the area is equal to the extracted energy). (d) Energy extracted vs. number of cycles for the $AgCl/LiFePO_4$ system.

FIG. 6: Galvanic representation of the electrochemical systems (a) $AgCl/Na_2Mn_5O_{10}$ and (b) $AgCl/LiFePO_4$.

FIG. 7: (a) ΔE* (as defined in equation S3) experimentally measured (squares) and predicted by equation S4 (line) at different concentrations of NaCl, obtained at point A of FIG. 4(c); and (b) mean activity coefficient of NaCl solution at different concentrations of NaCl.

FIG. 8: (a) ΔE* (as defined in equation S3) experimentally measured (squares) and predicted by equation S4 (line) at different concentrations of LiCl; and (b) mean activity coefficient of LiCl solution at different concentrations of LiCl.

FIG. 10: SEM images of the as prepared $Na_2Mn_5O_{10}$ showing (a) good uniformity of nanorod morphology throughout the sample, and (b) nanorods with an average size distribution of about 300 nm in width and 1 to 3 microns in length.

FIG. 12: Galvanostatic (250 nA) cycles of $Na_2Mn_5O_{10}$ at (a) high potentials (1.2 V) and (b) low potentials (0.45 V).

DETAILED DESCRIPTION

Definitions

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to a component can include multiple components unless the context clearly dictates otherwise.

As used herein, the term "set" refers to a collection of one or more components. Thus, for example, a set of components can include a single component or multiple components. Components of a set also can be referred as members of the set. Components of a set can be the same or different. In some instances, components of a set can share one or more common characteristics.

As used herein, the terms "connect," "connected," "connecting," and "connection" refer to an operational coupling or linking. Connected components can be directly coupled to one another or can be indirectly coupled to one another, such as through another set of components.

Mixing Entropy Battery

Embodiments of the invention relate to an electrochemical system including a "mixing entropy battery," which extracts energy of both cations and anions from a difference in concentration of those ions in two solutions, and stores that energy as chemical energy inside bulk crystal structures of electrodes. Advantageously, the battery overcomes a number of challenges of previous technologies, including issues related to self-discharge and low energy densities.

In an embodiment, the battery is a reversible electrochemical system in which the electrodes store and release ions, as one electrolyte or solution having one concentration of the ions is substituted or exchanged with another electrolyte or solution having a different concentration of the ions. One electrolyte can be freshwater or river water with a lower concentration of $Na^+$ and $Cl^-$ ions, and another electrolyte can be seawater with a higher concentration of $Na^+$ and $Cl^-$ ions. Other electrolytes having different concentrations of other types of ions can be used. For example, another cation that is monovalent, divalent, trivalent, or polyvalent of the form $C^+$, $C^{2+}$, $C^{3+}$, $C^{4+}$, or $C^{n+}$ (n being an integer) can be used in place of, or in conjunction with, $Na^+$, such as $H^+$, $K^+$, or $Li^+$, and another anion that is monovalent, divalent, trivalent, or polyvalent of the form $A^-$, $A^{2-}$, $A^{3-}$, $A^{4-}$, or $A^{m-}$ (m being an integer) can be used in place of, or in conjunction with, $Cl^-$. Polyatomic or molecular ions also can be used.

In an embodiment, the battery includes two different electrodes to provide anion and cation selectivity: an anode selectively stores and releases anions (e.g., $Cl^-$ ions), and a cathode selectively stores and releases cations (e.g., $Na^+$ ions). Energy is extracted from a difference in concentration of the ions between two electrolytes (e.g., river water versus seawater). To extract desirable amounts of energy, this difference in concentration can be such that a molar concentration (or molarity M) of the ions in a high concentration electrolyte is at least 1.5 times the corresponding concentration of the ions in a low concentration electrolyte, such as at least about 2 times, at least about 5 times, at least about 10 times, at least about 15 times, or at least about 25 times, and up to about 50 times, about 100 times, or more.

Figure 1:
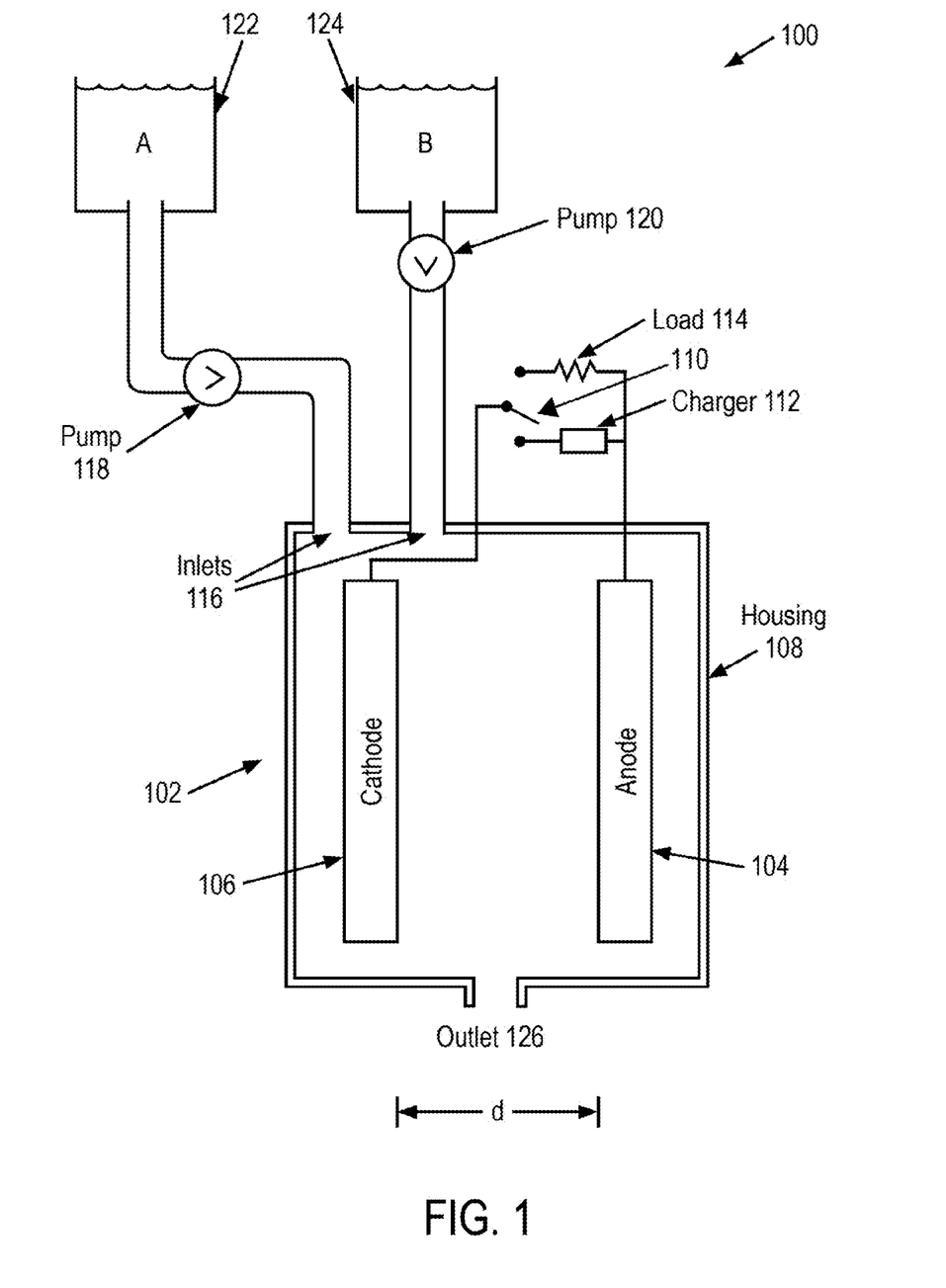
FIG. 1: Schematic representation of a system including a mixing entropy battery and related components for energy extraction from a salinity difference.

Attention first turns to FIG. 1, which illustrates a system 100 including a mixing entropy battery 102 and related components, according to an embodiment of the invention. In the illustrated embodiment, the battery 102 includes a set of electrodes, namely an anode 104 and a cathode 106, which are disposed within a housing 108 or other suitable container. The electrodes 104 and 106 are electrically connected to a circuitry, which includes a switch mechanism 110. During charging operations, the switch mechanism 110 establishes an electrical connection between the electrodes 104 and 106 through a charger 112, and, during discharging operations, the switch mechanism 110 establishes an electrical connection between the electrodes 104 and 106 through a load 114. The flow of an electrical current through the load 114 represents the extraction of useful work.

Still referring to FIG. 1, the housing 108 includes a set of inlets 116, which are fluidly connected to a set of pumps 118 and 120 (or other fluid conveyance mechanisms) and a set of reservoirs 122 and 124 (or other suitable containers). In particular, a reservoir A 122 serves as a source of a low concentration electrolyte (e.g., river water), which can be conveyed by the pump 118 into the battery through one inlet of the housing 108, and a reservoir B 124 serves as a source of a high concentration electrolyte (e.g., seawater), which can be conveyed by the other pump 120 into the battery 102 through another inlet of the housing 108. As further described below, the pumps 118 and 120 are operated so as to substitute or exchange one electrolyte within the battery 102 (and in which the electrodes 104 and 106 are immersed) with another electrolyte, and to synchronize such substitution with respect to charging and discharging operations of the battery 102. Upon substitution with one electrolyte, a departing electrolyte exits the battery 102 through an outlet 126 of the housing 108. It should be recognized that FIG. 1 illustrates one embodiment of a system including a mixing entropy battery, and that a number of other embodiments are contemplated. For example, the number of inlets, outlets, electrodes, and reservoirs can be varied from that illustrated in FIG. 1, such as by combining or sub-dividing these components. Also, while not illustrated in FIG. 1, a controller can be included to control the operation of the system 100, which controller can be implemented in software, hardware, or a combination of software and hardware.

Figure 2:
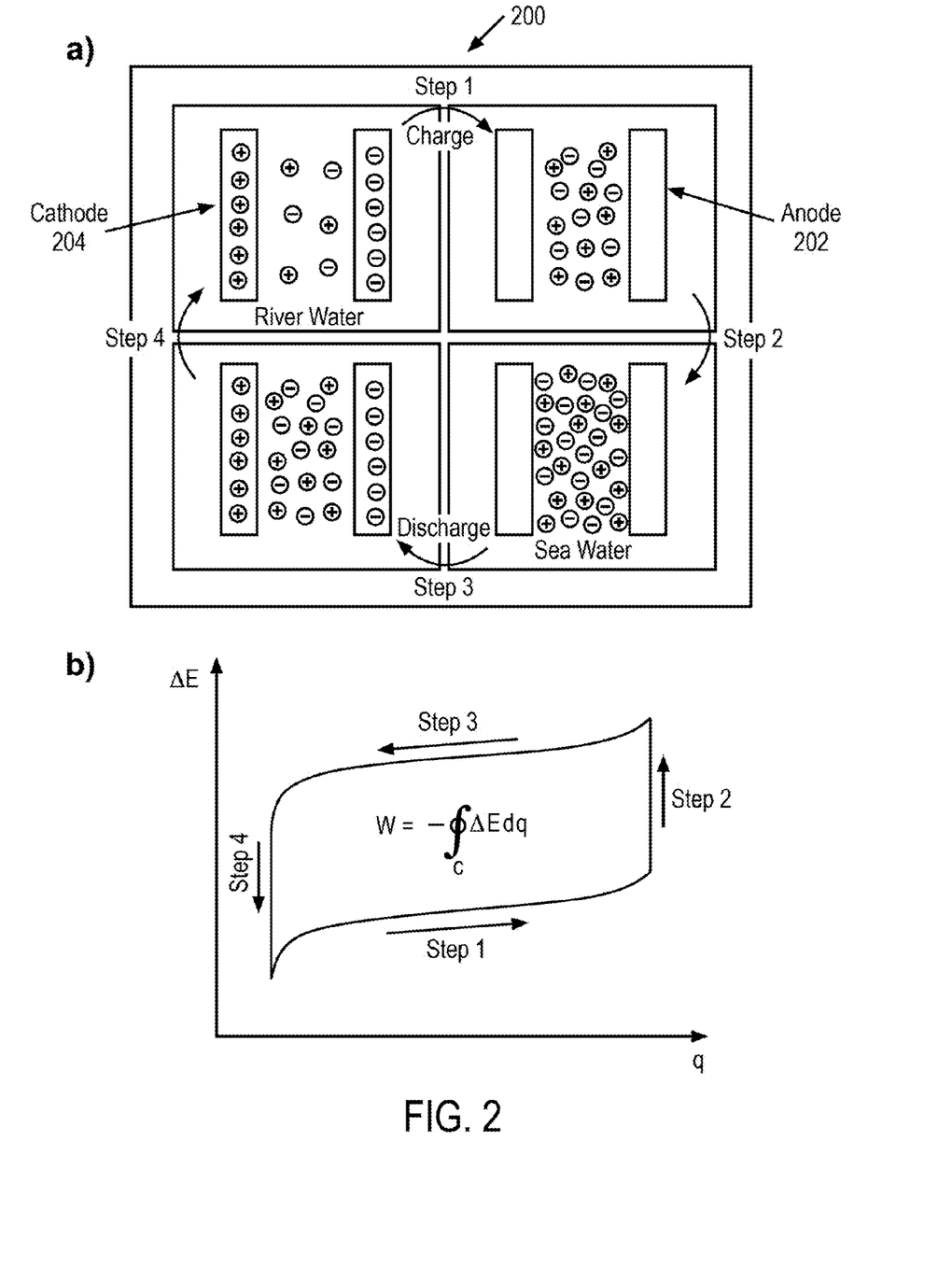

The operation and working principle of a mixing entropy battery 200 can be further appreciated with reference to FIG. 2. As illustrated in FIG. 2(a), the battery 200 includes two different electrodes: an anode 202, which selectively interacts with $Cl^-$ ions; and a cathode 204, which selectively interacts with $Na^+$ ions. Energy from both $Na^+$ and $Cl^-$ ions, therefore, can be extracted in the battery 200. The electrodes 202 and 204 are initially submerged in a low ionic concentration electrolyte (here, river water) in their discharged states, where the electrodes 202 and 204 include their respective ions incorporated within their crystal structures, such as by intercalation or other suitable mechanism. In this low concentration electrolyte, the battery 200 is charged, which removes the $Na^+$ and $Cl^-$ ions from their respective electrodes 202 and 204 (Step 1). Next, the low concentration electrolyte is exchanged for a high ionic concentration electrolyte (here, seawater), which is accompanied by an increase in an electrical potential difference between the electrodes 202 and 204 or a battery cell voltage (Step 2). At this higher potential difference, the battery 200 is discharged, as the anions and cations are re-incorporated into their respective electrodes 202 and 204 (Step 3). The high concentration electrolyte is then removed and substituted by the low concentration electrolyte (here, river water), which results in a decrease in the electrical potential difference between the electrodes 202 and 204 (Step 4), thus completing the cycle.

This cycle produces energy, as shown in FIG. 2(b) as a schematic of the battery cell voltage ($\Delta E$) versus electrode charge (q) during one cycle. During Steps 2 and 4, little or no energy is produced or consumed, other than energy to substitute one electrolyte for another electrolyte. Some energy is supplied during charging in Step 1, while energy is produced in Step 3. Unlike traditional batteries, energy is not merely stored, but instead a greater amount of energy is extracted from the battery 200 than was initially supplied. This gain in energy is supplied by the difference in salinity of seawater and river water, and is given by the integral along the cycle of the battery cell voltage with respect to the electrode charge:

$$W = -\oint_c \Delta E \, dq \quad (1)$$

Figure 3:
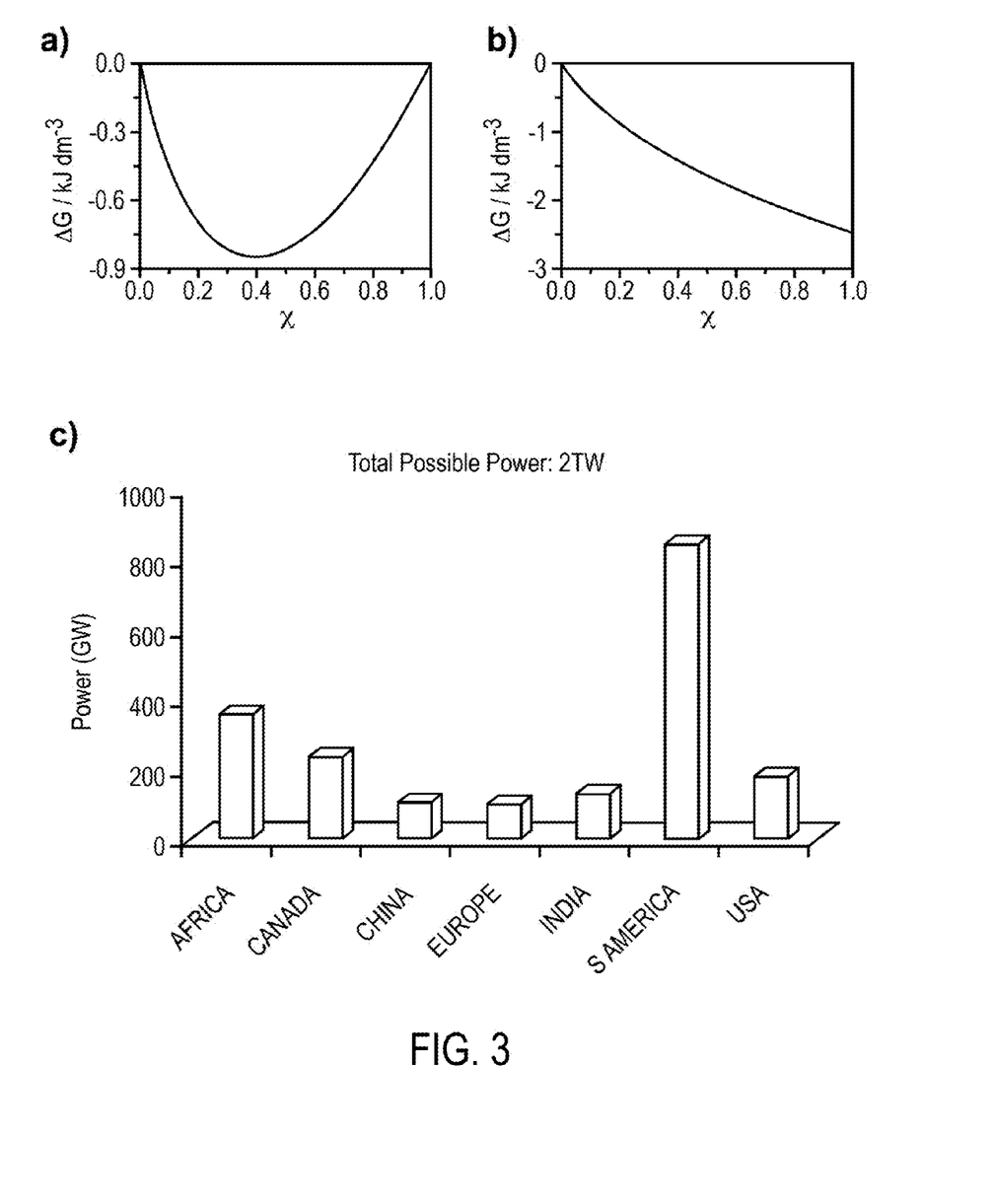

To more fully appreciate how energy is produced during cycling, the following presents an underlying thermodynamic process of an entropy of mixing between two solutions of different salt concentrations. A difference in Gibbs free energy per unit of volume ($\Delta G$) between a solution (after mixing seawater and river water) and the separate seawater and river water before mixing can be calculated as a function of a volumetric fraction of sea water, $\chi$. The minimum in FIG. 3(a), which is the maxima of mixing entropy of the two solutions, is obtained at $\chi \approx 0.4$ and is equal to $\Delta G \approx -0.85$ kJ $dm^{-3}$ with respect to the mixed solution. FIG. 3(a) is based on the following equation:

$$\frac{\Delta G}{RT} = C_T \ln(C_T) - xc_1\ln(C_1) - (1-x)c_2\ln(c_2) \quad (2)$$

where R is the universal gas constant, T is the absolute temperature, $c_T$ is the concentration of the mixed solution, $c_1$ is the concentration of the first solution (e.g., river water), and $c_2$ is the concentration of the second solution (e.g., seawater). An activity coefficient can be considered to be unity over the range of salt concentrations examined here (about 0.024 M for river water, and about 0.60 M for seawater; see examples for further details).

In order to calculate a maximum extractable energy per unit volume of river water, the Gibbs free energy of mixing is plotted with respect to the volume of river water consumed in FIG. 3(b). The energy to mechanically exchange river water and seawater in a battery is assumed to be negligible compared to the total energy produced. For an excess of seawater reagent, the maximum energy extractable is $\Delta G \approx -2.5$ kJ $dm^{-3}$ of river water (obtained for $\chi \approx 1$). Thus, a power plant processing 1000 $m^3$ $s^{-1}$ of river water could produce up to about 2.5 GW. An added advantage of the battery 200 is that a final product will be seawater at ambient temperature, which would have a minimal environmental impact since the mixing process occurs naturally at a river outlet.

A specific embodiment of a mixing entropy battery was implemented as an electrochemical cell employing the following reaction:

$$5MnO_2 + 2Ag + 2NaCl \leftrightarrow Na_2Mn_5O_{10} + 2AgCl \quad (R1)$$

where an $Na_{2-x}Mn_5O_{10}$ cathode formed of nanorods was used to capture $Na^+$ ions via intercalation, and a silver (Ag/AgCl) anode was used to capture $Cl^-$ ions (see examples for detailed electrode preparation). Among other $Na^+$ intercalation materials, $Na_2Mn_5O_{10}$ was selected because of its energy density, low cost, and benign environmental impact. However, other $Na^+$ intercalation materials, such as $Na_4Mn_9O_{18}$, $Na_{0.7}MnO_2$ (sodium birnessite), or more generally $Na_xMn_yO_z$, can be used in place of, or in combination with, $Na_2Mn_5O_{10}$. Other cathode materials can be used, such as those including sodium, lithium, hydrogen, or a combination thereof. The Ag/AgCl anode captures $Cl^-$ ions by a reversible reaction between Ag and $Cl^-$ ions that forms AgCl, which is insoluble in water. Other anode materials can be used in place of, or in combination with, silver, such as lead, copper, and other metals that form an insoluble chloride salt, as well as materials that capture $Cl^-$ ions via intercalation. The amount of ions captured by the anode and the cathode can be quantified based on their specific capacities (charge per unit weight), and, in an embodiment, a specific capacity of either, or both, the anode and the cathode is at least about 1 mAh/g, at least about 5 mAh/g, at least about 10 mAh/g, at least about 15 mAh/g, or at least about 20 mAh/g, and up to about 50 mAh/g, about 100 mAh/g, or more. Because a greater number of ions can be captured within bulk crystal structures of the anode and the cathode, their specific capacities can be considerably greater than an implementation using supercapacitor electrodes, which store charge at their surfaces rather than within their bulk.

Figure 4:
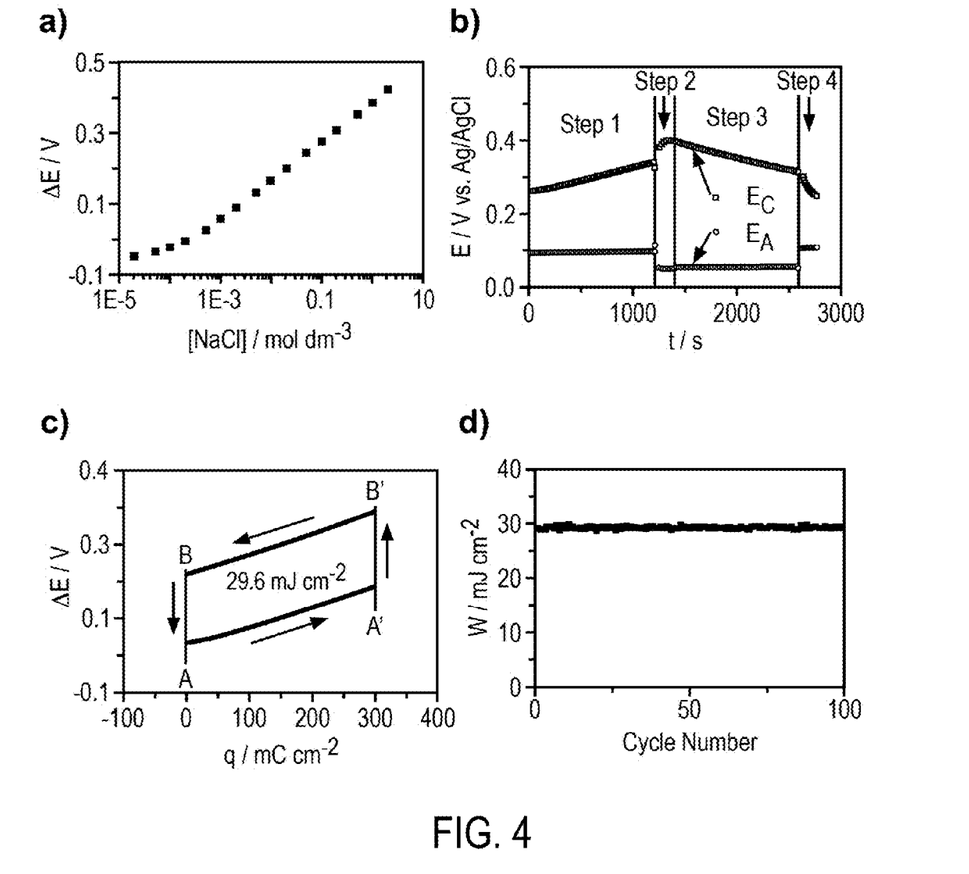

For this specific embodiment, an equilibrium potential difference of the reaction R1 was measured as a function of the concentration of NaCl in an electrolyte (FIG. 4(a)). As can be appreciated, the equilibrium potential difference increased with NaCl concentration (see examples for further details). A gain in energy was correlated to the change in the potential difference obtained at different NaCl concentrations. In the following, the change in the potential difference is referred as a thermodynamic gained potential, $V_G$. In the case of seawater (about 0.6 M NaCl) and river water (about 0.024 M NaCl), the thermodynamic gained potential $V_G$ was about 0.135 V (see examples for further details). This value is almost 5 times greater than the corresponding gained potential obtained using a supercapacitor material (activated carbon) for electrodes ($V_G \approx 0.033$ V).

In FIG. 4(b), a typical cycle of the Ag/AgCl and $Na_2Mn_5O_{10}$ system is illustrated for the anode and the cathode (vs. a Ag/AgCl/KCl 3.5 M reference electrode). In the presence of the low concentration electrolyte, the potential difference of the two electrodes is relatively small. In Step 1, the battery is charged by removing the ions from AgCl and $Na_2Mn_5O_{10}$, thus gradually increasing the potential difference of the two electrodes. The current density applied is about 250 $\mu A\ cm^{-2}$, and a time limit of about 20 minutes is imposed (see examples for further details). During step 2, the low concentration electrolyte is substituted by the concentrated one, and consequently the potential difference between the two electrodes increases significantly. During Step 3, the battery is discharged, and the ions are captured by the electrodes, while the potential difference gradually decreases. The current density during discharge is about $-250\ \mu A\ cm^{-2}$, with a time limit of about 20 minutes. The voltage difference between the Ag/AgCl and $Na_2Mn_5O_{10}$ electrodes is plotted during this cycling process ($\Delta E$ vs. q) in FIG. 4(c). After one full cycle, the energy density produced is about 29 mJ $cm^{-2}$ (power density of about 10.5 $\mu W\ cm^{-2}$), which is about 180 times greater than the corresponding energy density of a supercapacitor system (energy density of about 0.16 mJ $cm^{-2}$ and power density of about 1.3 $\mu W\ cm^{-2}$). Still referring to FIG. 4(c), the change in the voltage difference ($\Delta E$) during charging and discharging is relatively smooth and gradual, thereby providing advantages in terms of a stable power output. This smooth and gradual behavior of the voltage difference ($\Delta E$) represents another advantage of the illustrated embodiment over previous technologies, such as a supercapacitor system.

A few spikes in the potential difference observed at the beginning and end of Step 1 (A and A') and step 3 (B and B') are due to electrochemical losses, known as overpotential. Due to this loss, the gained potential is $V_G \approx 0.100$ V (about 74% efficiency, as compared to the thermodynamically predicted potential gain). Optimization of the battery configuration can be carried out to improve this gain, as the electrodes of the illustrated embodiment are at a distance (d) of about 1 cm from each other (see FIG. 1), and cycling is performed in the presence of air. The resistance was about 75Ω for the low concentration electrolyte (about 75% of the total internal resistance of the battery) and about 5Ω in the concentrated electrolyte (about 20% of the total internal resistance of the battery), creating the overpotential. This overpotential can be decreased (and thus the power and energy efficiency can be increased) by an optimized cell geometry using more closely spaced electrodes, and allowing a small amount of seawater to remain in the battery when adding the river water to reduce the resistance of the low concentration electrolyte (see examples for further details). For example, the distance between the electrodes can be no greater than about 1 cm, no greater than about 500 μm, no greater than about 200 μm, no greater than about 100 μm, or no greater than about 50 μm, and down to about 10 μm, about 5 μm, or less, and cycling can be performed in an inert atmosphere or other controlled atmosphere.

Through such optimization, an energy conversion efficiency of about 85% or greater can be achieved at a given current density (see examples for further details). Experimentally observed energy that was produced with respect to cycle number is illustrated in FIG. 4(d). As can be appreciated, battery operation was quite stable even after more than 100 cycles, with essentially no observable loss in energy production over this period. This consistent power production derives at least in part because both anionic and cationic electrodes operate within a stability window of water, and the electrode materials are quite stable in an aqueous environment.

In order to further assess performance of the battery, measurements were conducted with real water samples collected from local natural water sources (see examples for further details). Little or no decrease in cycling performance was observed when these samples were used, and there was little or no electrode degradation, self-discharge, and other detrimental effects. The energy conversion efficiency of the battery was about 75%, which is much higher than other technologies (see Table 1).

TABLE 1

| Technology | Efficiency |
| --- | --- |
| Pressure retarded osmosis | 23-24%* |
| Reverse electrodialysis | 21%* |
| Concentration cell | <42% |
| Vapor pressure difference | 23%* |
| Capacitative salination | <24% |
| Mixing entropy battery | 74-85%* |

The extractable power from a difference of salinity of river water and seawater that could be obtained in different countries around the world is summarized in FIG. 3(c). If the energy from mixing entropy was harnessed from all available rivers, the power obtained could reach up to about 2 TW, which is about 13% of the current total global energy requirement. A power plant based on a mixing entropy battery would allow energy to be efficiently harvested at low temperatures, and would be fully renewable, since the ultimate source is the solar energy that powers the water cycle.

The mixing entropy battery and related systems and methods described herein represent an improved electrochemical system compared to existing technologies. In particular, the mixing entropy battery can efficiently extract energy, without requiring expensive membranes with short operational life spans. Also, the mixing entropy battery is more effective than supercapacitor technologies, since the bulk of electrodes are used to accumulate charge, rather than being limited to surfaces of the electrodes. Moreover, and unlike other technologies, the mixing entropy battery includes different electrodes that are selective to respective ions (e.g., $Na^+$ and $Cl^-$ ions). The provision of these selective electrodes renders the battery with a greater insensitivity to impurities, such as other types of ions like carbonates and bicarbonates, which can cause self-discharge and lower the efficiency of other existing technologies.

It should be recognized that the embodiments described above are provided by way of example, and other embodiments are contemplated.

For example, another embodiment can operate by using solar energy to distill water, with a complete recycle of an electrolyte to achieve conversion of solar energy into electrical energy. In particular, distillation (through solar energy) can yield a distillate as the low concentration electrolyte and a concentrate as the high concentration electrolyte. Energy can be extracted based on a difference in concentration as previously described. In effect, solar energy is harvested to create an artificial "water cycle," which can be closed by recycling materials. A system can operate using electrolytes based on of the following reaction:

$FePO_4 + Ag + LiCl \leftrightarrow LiFePO_4 + AgCl$ (R2)

LiCl is highly soluble (832 g $dm^{-3}$ in water), and $LiFePO_4/FePO_4$ is a two-phase system with a potential capable of rapid charging and discharging. With the possible exception of Ag, these materials are inexpensive and environmentally benign. In tests with about 0.03 M and about 1.5 M solutions, an energy density of about 38.2 mJ cm$^{-2}$ (power density of about 13.8 μW cm$^{-2}$) was produced that was stable over 100 cycles. Results for the AgCl/LiFePO$_4$ system are illustrated in FIG. 5(a)-(d). These results indicate that this system can be used as a way of harnessing solar energy in a fully renewable manner, and with repeated cycling of materials with little or no loss of reagents.

As another example, the steps for generating electrical energy of FIG. 2(a) can be reversed, and used as a method for water desalination. Reverse osmosis is typically used for water desalination, but involves expensive membranes and high water pressures. Capacitive deionization is an alternative membrane-less method for removing salts from water by applying a potential between two electrodes. However, capacitive deionization is relatively energy intensive. By using the reverse of the method described herein, water can be desalinated without requiring membranes and with reduced energy requirements.

EXAMPLES

Electrochemical Thermodynamics Details

Figure 6:
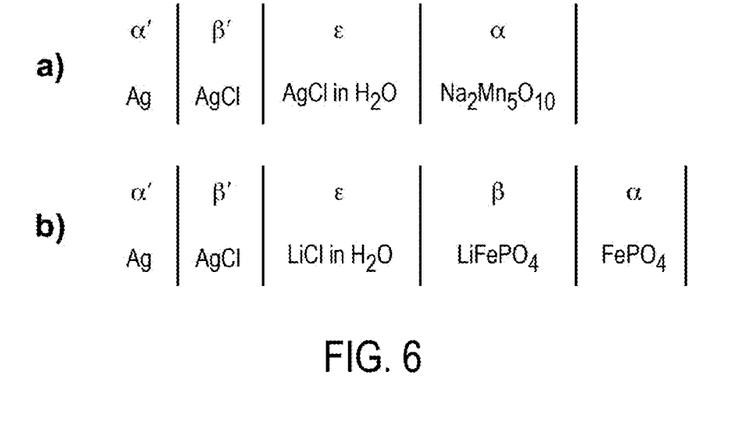

In FIG. 6 is reported the schematic representation of the electrochemical system AgCl/Na$_2$Mn$_5$O$_{10}$. The two separate electrochemical reactions can be written as:

$$5MnO_{2(\alpha)} + 2Na^+(\epsilon) + 2e^-(\alpha) \leftrightarrows Na_2Mn_5O_{10(\alpha)}$$

$$2AgCl_{(\beta')} + 2e^-(\alpha') \leftrightarrows 2Ag_{(\alpha')} + 2Cl^-(\epsilon) \qquad (S1)$$

where α is the Na$_{2-x}$Mn$_5$O$_{10}$ phase, ε the electrolyte phase, β' the AgCl phase, and α' the Ag phase. The potential of the two reactions with respect to the normal hydrogen electrode (NHE) is given by:

$$E_+ = E_{+,0} + \frac{RT}{F}\ln\left[\frac{a_{Na,\epsilon}}{a_{Na,\alpha}}\right] \qquad (S2a)$$

$$E_- = E_{-,0} - \frac{RT}{F}\ln[a_{Cl,\epsilon}]$$

where $E_1$ and $E$ are the potentials of the electrodes, $E_{+,0}$ and $E_{-,0}$ the standard potentials of the electrodes, $a_{Na,\alpha}$ the activity of the sodium in the solid phase α, $a_{Na,\epsilon}$ the activity of the sodium ions in the electrolyte, $a_{Cl,\epsilon}$ the activity of the chlorides in the electrolyte. The difference between the two potentials is ΔE. If the activity of sodium in the solid phase is fixed (no current flowing), one obtains:

$$\Delta E = \Delta E_0(a_{Na,\alpha}) + 2\frac{RT}{F}\ln[c_{NaCl}] + 2\frac{RT}{F}\ln[\gamma_{NaCl}] \qquad (S2b)$$

where $\Delta E_0$ is the standard cell voltage, $c_{NaCl}$ the concentration of NaCl, $\gamma_{NaCl}$ the mean activity coefficient of NaCl. Equation S2b can be rearranged as:

$$\Delta E^* = \Delta E - 2\frac{RT}{F}\ln[c_{NaCl}] = \Delta E_0 + 2\frac{RT}{F}\ln[\gamma_{NaCl}] \qquad (S3)$$

where the variable ΔE* is defined for convenience in graphing. ΔE* can be calculated once the value of ΔE is measured at the various concentrations. In general, ΔE* can be used to obtain the value of ΔE$_0$ and the dependence of $\gamma_{NaCl}$ on $c_{NaCl}$, using the Debye-Hückel law. For diluted solutions of completely dissociated salts, the mean activity coefficient of the salt follows the Debye-Hückel law:

$$\ln[\gamma_{NaCl}] = -\frac{A\sqrt{c_{NaCl}}}{1 + B\sqrt{c_{NaCl}}} \qquad (S4)$$

Figure 7:
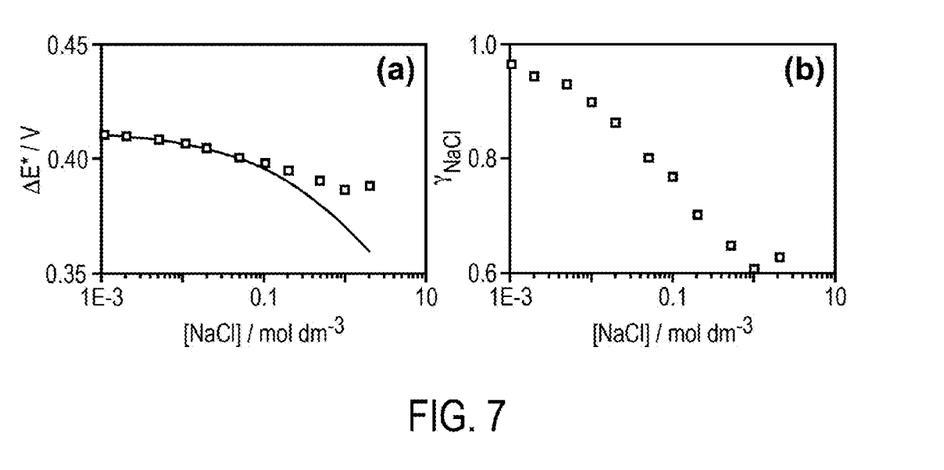

From the fitting of the experimental data reported in FIG. 7a, the value of ΔE$_0$≈0.4127 V is obtained. In equation S4, the value of A is equal to 36.59 cm$^{1.5}$ mol$^{-0.5}$, in good agreement with the theoretical predication of 37.65 cm$^{1.5}$ mol$^{-0.5}$. B is proportional to the mean hydrodynamic radius of the ions. The value of B obtained is 12.27 cm$^{1.5}$ mol$^{-0.5}$, which corresponds to a hydrodynamic radius equal to 1.2 Å. Equations S3 and S4 were fitted to the data in the concentration range between 1 and 20 mM. The potential difference at lower concentrations is strongly affected by impurities, such as oxygen, while at high concentrations equation S4 is outside the range of validity, as the Debye-Hückel law is only valid for diluted solutions. Using the value we obtained for ΔE$_0$, in FIG. 7b, the value of $\gamma_{NaCl}$ at different concentration is reported. The mean activity coefficient can be used to calculate the mixing energy of two solutions at different volumetric fractions. The Gibbs free energy of mixing is equal to:

$$\frac{\Delta G}{2RT} = \frac{\Delta G_{id}}{2RT} + \ln\left[\frac{\gamma_T}{\gamma_C^x \gamma_D^{1-x}}\right] \qquad (S5)$$

where $\Delta G_{id}$ is the one reported in equation (2) of the main text, $\gamma_T$ the mean activity coefficient of NaCl in the mixed solution, $\gamma_C$ the mean activity coefficient of NaCl in the concentrated solution (sea water), and $\gamma_D$ the mean activity coefficient of NaCl in the diluted solution (river water). The error committed by using equation (1) as an estimate, instead of equation (S5), is at most 22 J dm$^{-3}$, which corresponds to about 2% of the total Gibbs energy.

It is possible to repeat the same calculation for the system LiFePO$_4$/AgCl, reported schematically in FIG. 6b:

$$FePO_{4(\alpha)} + Li^+(\epsilon) + e^-(\alpha) \leftrightarrows LiFePO_{4(\beta)}$$

$$AgCl_{(\beta')} + e^-(\alpha') \leftrightarrows Ag_{(\alpha')} + Cl^- \qquad (S6)$$

In which case the equilibrium potential does not depend on the amount of lithium extracted from the LiFePO$_4$ phase:

$$E_+ = E_{+,0} + \frac{RT}{F}\ln[a_{Li,\epsilon}] \qquad (S7)$$

$$E_- = E_{-,0} - \frac{RT}{F}\ln[a_{Cl,\epsilon}]$$

Figure 5:
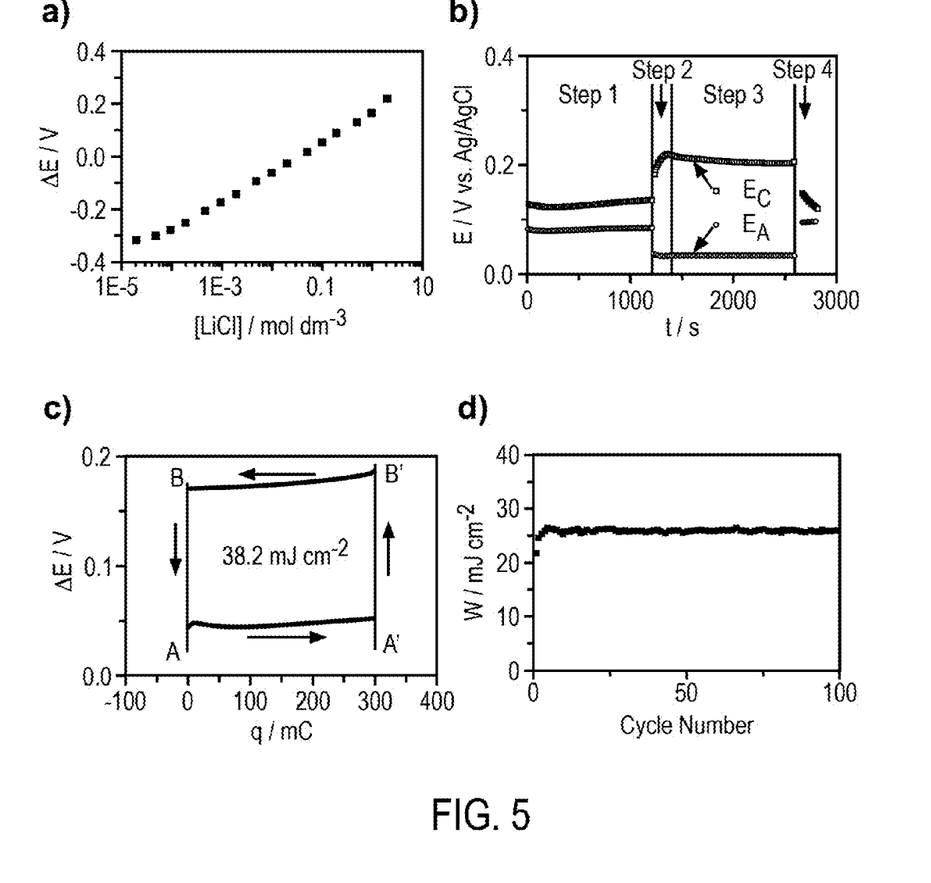

As demonstrated by the experimental results shown in FIG. 5(a) the total potential difference has to increase with the concentration of the LiCl salt, according to the following equation:

$$\Delta E = \Delta E_0 + \frac{RT}{F}\ln[a_{Li,\epsilon} a_{Cl,\epsilon}] \qquad (S8)$$

Figure 8:
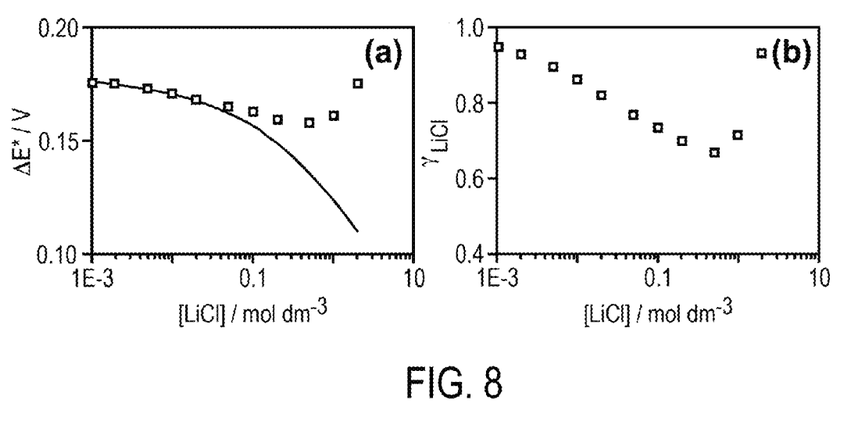

Using the same equations described previously, the mean activity coefficient of LiCl in water solution is obtained at different concentration, as reported in FIG. 8. The value of $\Delta E_0$ for this system is equal to 0.1784. It is interesting to observe that the activity coefficient increases at concentration above 0.5 M, which means higher concentrations of salt allows more energy to be extracted than predicted by equation (1).

Synthesis and Characterization of the $Na^+$ Capturing Electrodes

Figure 9:
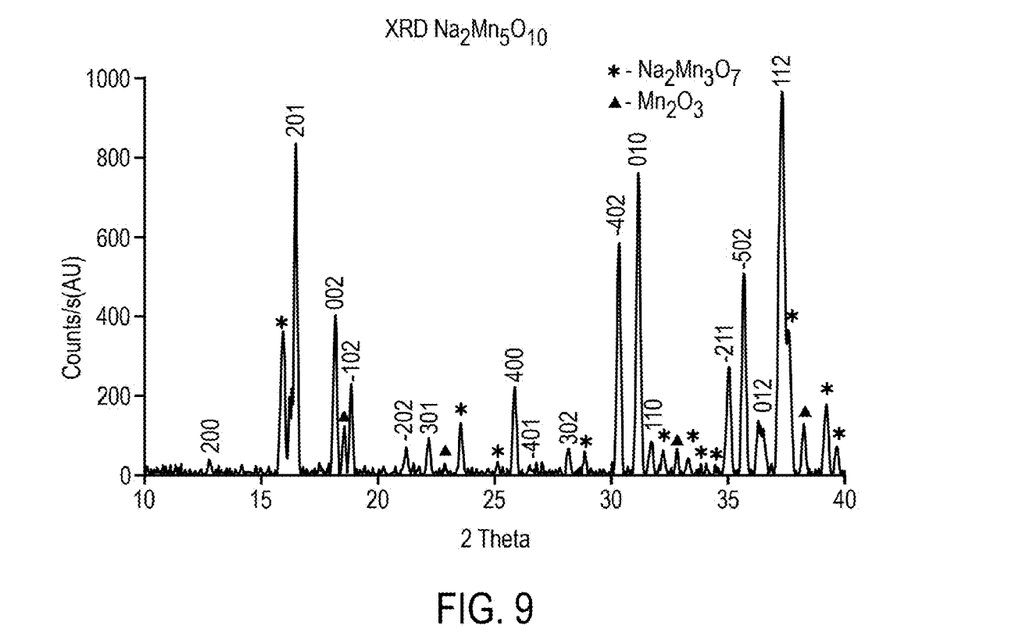
FIG. 9: XRD pattern of the prepared sample, with the minority phases of $Na_2Mn_3O_2$ and $Mn_2O_3$ labeled.

Sodium manganese oxide, $Na_2Mn_5O_{10}$, was synthesized by soaking cotton in an aqueous solution of $NaNO_3$ (0.2 M) and $Mn(NO_3)_2$ (0.5 M). The cotton was then wrung out and heated in air in a Lindberg Moldatherm Box Furnace (Fischer Scientific) at a rate of 100° C. $h^{-1}$ to a final temperature of 700° C. This temperature was sustained for 24 hours, and then the material was allowed to cool to room temperature. The resultant powder was characterized with X-ray powder diffraction measurements using an X-ray diffractometer (XRD, Rigaku, D/MAX-IIIC X-ray diffractometer, Tokyo, Japan) with Cu KR radiation ($\lambda$=0.15406 nm at 45 kV and 40 mA). Representative XRD patterns are shown in FIG. 9. This pattern corresponds to a mixture of phases, primarily composed of the monoclinic $Na_2Mn_5O_{10}$ phase, but with additional minority phases of both $Na_2Mn_3O_7$ and $Mn_2O_3$. Synthesis conditions can be further optimized to reduce or eliminate the presence of these minority phases, but they appear to be electrochemically inert in the conditions under which experiments were performed. Therefore, this preliminary material is adequate to illustrate the feasibility of the method.

Figure 10:
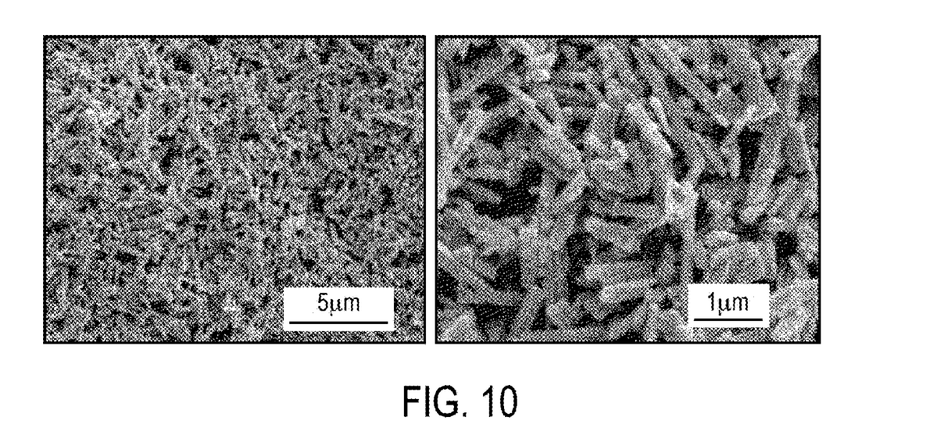

The powder was also thoroughly ground for Scanning Electron Microscopy imaging to determine the average particle size and particle morphology. SEM measurements were performed on a FEI XL30 Sirion microscope on uncoated powder samples. Images were recorded at 5 kV with a secondary electron beam. As can be seen from the images (FIG. 10a-b), the conditions of the synthesis give rise to a rod-like morphology.

Synthesis and characterization of $LiFePO_4$ can be carried out in accordance with conventional techniques. The $LiFePO_4$ used was obtained from Alees (Advanced Lithium Electrochemistry Co., Ltd., product number LFP-NCO). $LiFePO_4$ is stable in neutral aqueous electrolyte, and has been tested as cathode for aqueous lithium-ion batteries.

Electrode Preparation and Electrochemical Characterization $Na_2Mn_5O_{10}$ and $LiFePO_4$ based electrodes were prepared by mixing the as synthesized powder of $Na_2Mn_5O_{10}$ or $LiFePO_4$ (80% wt.) with Super-P (Timcal) (9% wt.), graphite KS6 (Timcal) (3% wt.), and PVdF (8% wt.). The mixture was ball milled with a methyl methacrylate ball and vial for 1 hour. N-methylpyrrolidone (NMP) was added to the powders. The resulting slurry was stirred overnight and successively drop cast onto a carbon cloth (CC) based current collector. CC was used to avoid corrosion problems due to the very aggressive (chlorides) environment. After drying in oven at 100° C. for 1 hour, the electrode was ready to be tested in the electrochemical cell.

Figure 11:
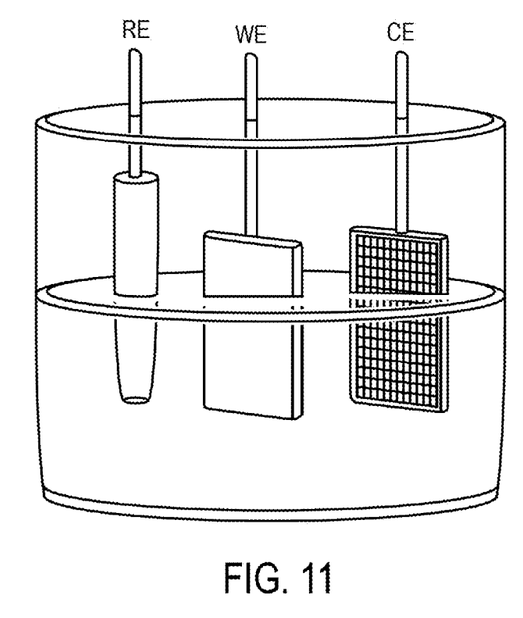
FIG. 11: Schematic of cell geometry, showing the silver mesh electrode (CE), $Na_2Mn_5O_{10}$ electrode (WE), and reference electrode (RE).

The electrochemical characterization was carried out in a three electrode cell (FIG. 11). Silver gauze (chloride capturing electrode) was employed as the counter electrode (CE), $Na_2Mn_5O_{10}$ or $LiFePO_4$ based electrodes (sodium and lithium ion capturing electrodes respectively) as working electrodes (WE) and Ag|AgCl|KCl (3.5 M) as the reference electrode (RE). In the presence of the reference electrode, both working and counter electrode potentials can be monitored. The Galvanic schemes are reported in FIG. 6.

Figure 12:
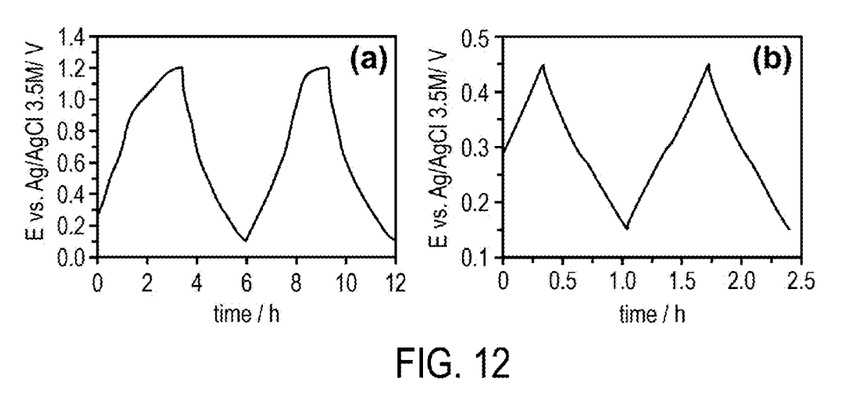

The geometrical electrode surface area in contact with the solution was 1 $cm^2$. The distance between positive and negative electrodes was 1 cm. The resistance of the electrolyte was measured by electrochemical impedance spectroscopy and was equal to 75Ω in diluted NaCl solution (river water) and 5Ω in concentrated NaCl solution (salt water). The high resistance measured in the diluted NaCl solution (river water) involves a high ohmic drop (about 20 mV), already outlined and discussed in the main text. The cell geometry can be further optimized and rendered compact by reducing the distance between electrodes. The as-prepared $Na_2Mn_5O_{10}$ was subjected to galvanostatic cycling in order to evaluate the best operative potential range (FIG. 12). It was cycled in a 0.6 M NaCl solution, using a platinum counter electrode and a Ag|AgCl|KCl (3.5 M) reference electrode. The material was originally tested up to 1.2 V (FIG. 12a). It is possible to observe three small plateaus at 0.3 V, 0.6 V and 1.0 V respectively. Among these three, the one at 0.3 V is highly reversible. Moreover, it is the best potential in terms of avoiding self discharge (at higher potentials oxygen evolution is not negligible). In FIG. 12b is shown the galvanostatic cycling of the material up to 0.45 V to check its reversibility.

Test with Collected Water Samples

Figure 13:
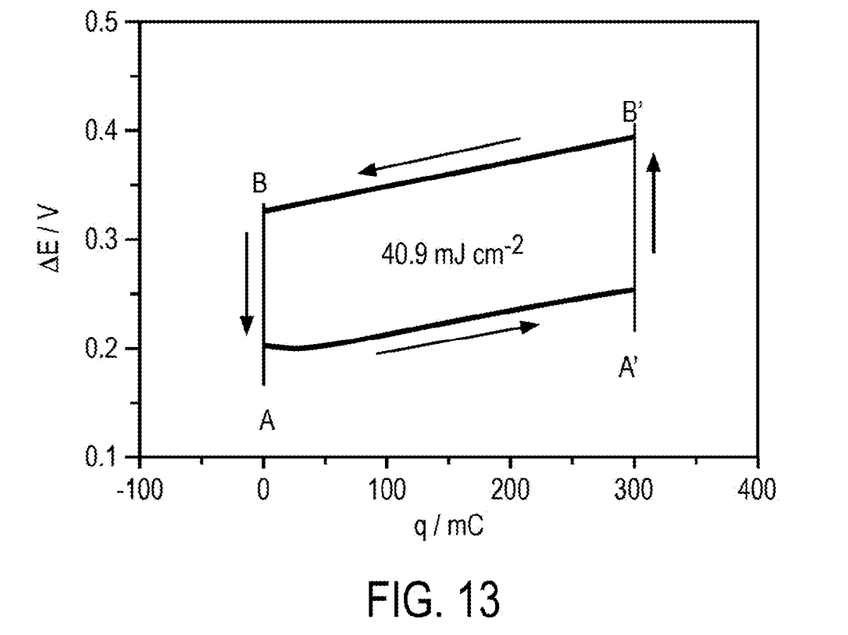
FIG. 13: Real sea water/river water energy extraction cycle for the $AgCl/Na_2Mn_5O_{10}$ system in a ΔE vs. q. plot (the area is equal to the extracted energy).
Figure 14:
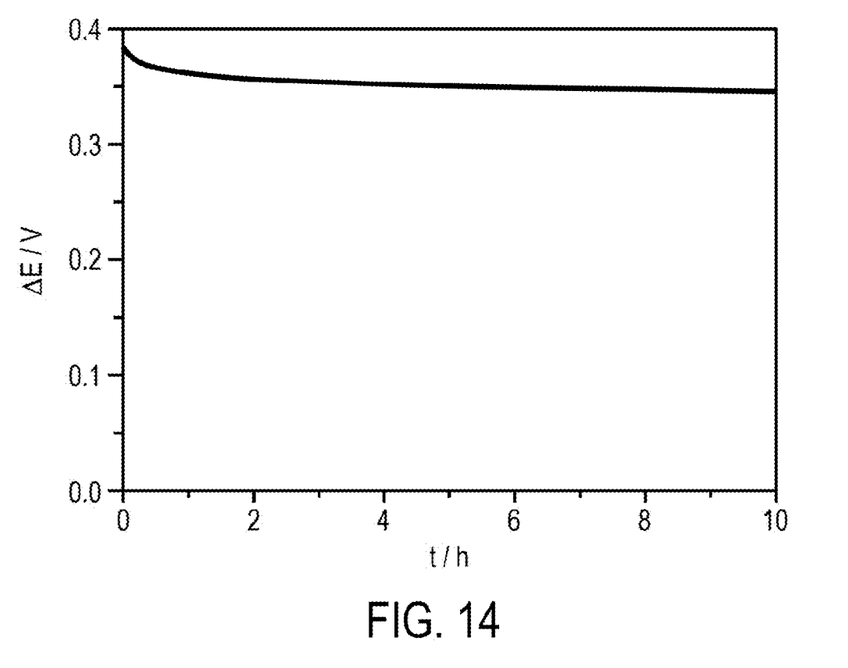
FIG. 14: Stability of the $AgCl/Na_2Mn_5O_{10}$ system in an actual seawater sample.

To investigate challenges that could arise from the use of real sea water and river water (impurities, presence of other cations and anions, etc.), samples from natural water sources were tested. Salt water was obtained from Half Moon Bay, San Francisco, Calif., and fresh water was collected from Donner Lake, Truckee, Calif. Due to the extremely low ion content of the lake water, a small amount of sea water (2%) was premixed with the river water to obtain a reasonable conductivity of the solution. FIG. 13 shows the results of this test. As can be observed, the extracted energy is about 41 mJ $cm^{-2}$ (the fresh water used contains less ions than the simulated solution, resulting in a larger gained potential), and the efficiency is 75%, essentially the same as was demonstrated in the previous laboratory test. The stability of the system in sea water was also tested. The electrodes were immersed in sea water, and allowed to equilibrate over several hours. In FIG. 14, the stability of $AgCl/Na_2Mn_5O_{10}$ in sea water is reported for a 10 hour period. During this time, the system loses 38 mV of the 186 mV it gained by the exchange of the river water with the sea water. The loss during the duration of one cycle (46 min) is about 10%. In a dynamic case, this effect would be repressed by the decrease of the potential during step 3.

While the invention has been described with reference to the specific embodiments thereof, it should be understood by those skilled in the art that various changes may be made and equivalents may be substituted without departing from the true spirit and scope of the invention as defined by the appended claim(s). In addition, many modifications may be made to adapt a particular situation, material, composition of matter, method, or process to the objective, spirit and scope of the invention. All such modifications are intended to be within the scope of the claim(s) appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:
1. An electrochemical system, comprising:
a battery including an anode and a cathode;
a charger;
a load;

a switch mechanism electrically connected to the anode and the cathode through, alternatively, the charger or the load;

a first source of a first electrolyte having a first concentration of ions;

a second source of a second electrolyte having a second concentration of the ions, wherein the second concentration is greater than the first concentration; and a fluid conveyance mechanism connected between the battery and each of the first source and the second source, wherein the electrochemical system is configured such that:

during charging of the battery, the anode and the cathode are at least predominantly immersed in the first electrolyte, relative to the second electrolyte, and during discharging of the battery, the anode and the cathode are at least predominantly immersed in the second electrolyte, relative to the first electrolyte, and wherein the fluid conveyance mechanism is configured to exchange the first electrolyte with the second electrolyte between charging and discharging of the battery, and the fluid conveyance mechanism is configured to exchange the second electrolyte with the first electrolyte between discharging and charging of the battery, and wherein the switch mechanism is configured such that:

during charging of the battery, the switch mechanism is configured to establish an electrical connection between the anode and the cathode through the charger, and disconnect the load between the anode and the cathode; and during discharging of the battery, the switch mechanism is configured to establish an electrical connection between the anode and the cathode through the load, and disconnect the charger between the anode and the cathode.

2. The electrochemical system of claim 1, wherein, during discharging of the battery, anions of the second electrolyte are incorporated within the anode, and wherein, during charging of the battery, at least a fraction of the anions is released from the anode into the first electrolyte.

3. The electrochemical system of claim 2, wherein at least one of the anions is monovalent.

4. The electrochemical system of claim 2, wherein at least one of the anions is divalent.

5. The electrochemical system of claim 2, wherein at least one of the anions is trivalent.

6. The electrochemical system of claim 2, wherein the anions include $Cl^-$ ions.

7. The electrochemical system of claim 1, wherein, during discharging of the battery, cations of the second electrolyte are incorporated within the cathode, and wherein, during charging of the battery, at least a fraction of the cations is released from the cathode into the first electrolyte.

8. The electrochemical system of claim 7, wherein at least one of the cations is monovalent.

9. The electrochemical system of claim 7, wherein at least one of the cations is divalent.

10. The electrochemical system of claim 7, wherein at least one of the cations is trivalent.

11. The electrochemical system of claim 7, wherein the cations include $Na^+$ ions.

12. The electrochemical system of claim 7, wherein the cations include $Li^+$ ions.

13. The electrochemical system of claim 7, wherein the cations include $H^+$ ions.

14. The electrochemical system of claim 1, wherein the cathode includes at least one of sodium, lithium, potassium, and hydrogen.

15. The electrochemical system of claim 1, wherein the anode includes AgCl.

16. The electrochemical system of claim 1, wherein the cathode includes a $Na^+$ intercalation material.

17. The electrochemical system of claim 1, wherein a molar concentration of the ions in the second electrolyte is at least 10 times a molar concentration of the ions in the first electrolyte.

18. The electrochemical system of claim 1, wherein a molar concentration of the ions in the second electrolyte is at least 15 times a molar concentration of the ions in the first electrolyte.

19. The electrochemical system of claim 1, wherein the cathode includes a material to store cations within a bulk crystal structure of the cathode.

* * * * *